J. ALLEND.
VEHICLE TIRE.
APPLICATION FILED APR. 2, 1908.
959,041.
Patented May 24, 1910.
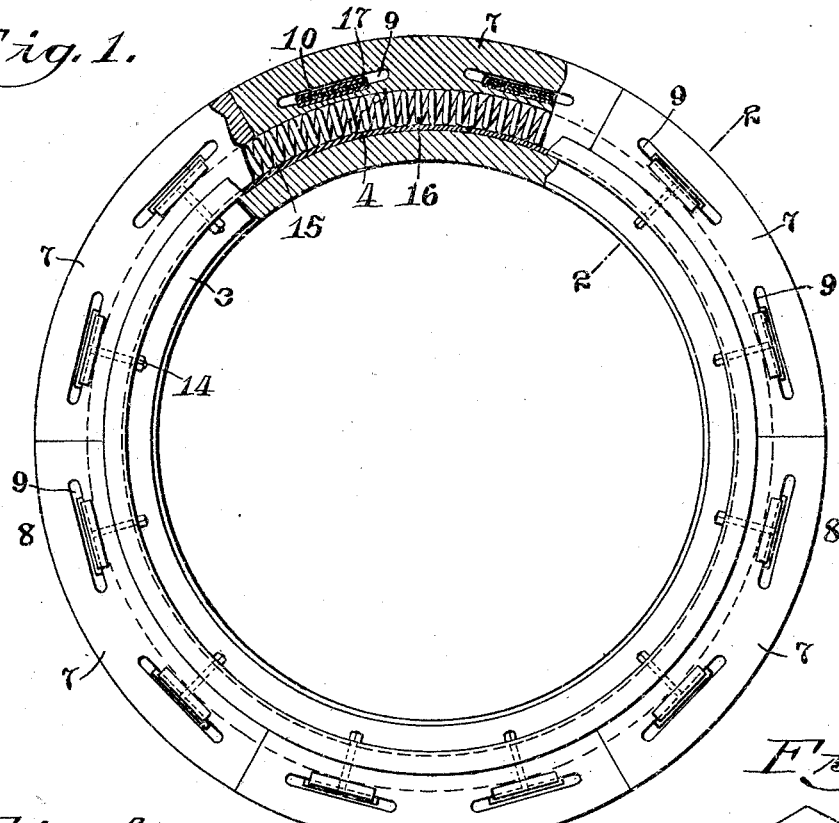
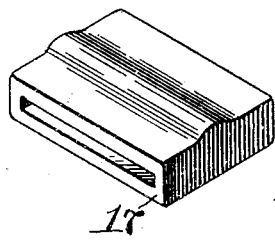
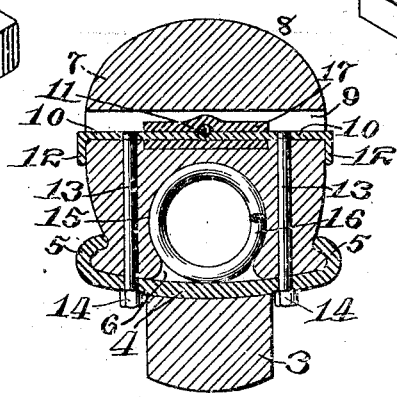
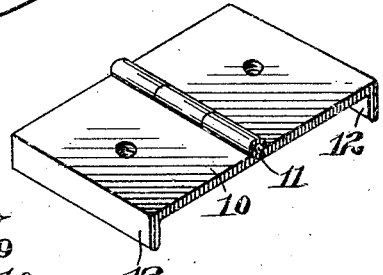
WITNESSES:
INVENTOR
Joseph Allend
BY
A. V. Troup
ATTORNEY.

UNITED STATES PATENT OFFICE.

JOSEPH ALLEND, OF PHILADELPHIA, PENNSYLVANIA.

VEHICLE-TIRE.

959,041.  Specification of Letters Patent.  Patented May 24, 1910.

Application filed April 2, 1908. Serial No. 424,806.

*To all whom it may concern:*

Be it known that I, JOSEPH ALLEND, citizen of the United States, residing at Philadelphia, in the county of Philadelphia and State of Pennsylvania, have invented certain new and useful Improvements in Vehicle-Tires, of which the following is a specification.

This invention relates to tires for vehicle wheels.

The object of the invention is to provide a simple and efficient sectional, resilient tire, in combination with a novel means whereby separate sections of the tire may be securely held in place, and removed from the wheel, and other sections substituted therefor.

To this end the invention consists in the novel construction and combinations of parts which will be hereinafter fully described and particularly pointed out in the claims.

In the drawings:—Figure 1 is an elevation, partly in section, of a portion of a vehicle wheel provided with my improved tire. Fig. 2 is a transverse section thereof, enlarged, as on the line 2—2, of Fig. 1. Fig. 3 is a perspective view of one of the clamping members for a section of the tire. Fig. 4 is a perspective view of the protecting collar for the hinged portion of the member shown in Fig. 3.

3 designates a wheel felly to which is secured a rim 4 of the usual clencher type, having the inturned edges 5 between which is formed a channel 6. Fitted to the channel 6 are the inner portions of the sections 7 of the tire 8, said sections being made of rubber or other suitable resilient material.

In the present embodiment of my invention, the sections 7 are six in number, the ends of which abut against each other and form in effect a continuous tire. Each section 7 is provided with two transverse openings 9, extending therethrough, and extending through each opening 9 is a clamping member comprising a pair of plates 10 the inner edges of which are hinged together, as at 11, and the outer edges of which are provided with inwardly bent flanges 12 which engage the sides of the section 7 as shown.

Screwed into the plates 10 are the outer ends of radially arranged bolts 13, which extend through suitable openings in the rim 4 and suitable openings in the side walls of the sections 7 of the tire. The screws 13 are provided with heads 14 which engage the rim 4 and serve to hold the sections 7 in place upon the rim. Formed in the inner portions of the sections 7 is a channel 15 which is fitted to a torsional spring 16 extending around the rim 4 within the channel 6 and in engagement with the rim.

In order to protect the hinged ends of the plates 10, I provide a collar 17 of rubber or other flexible material, which may be slipped over the inwardly bent ends 12 of the plates 10 and into the position shown in Fig. 2.

By the construction just described, it will be seen that an efficient resilient or cushion tire is obtained; and when the parts are assembled in the position shown, the tire may yield toward the rim 4 against the action of the torsional spring 16. The bolts 13 being fitted freely to openings in the rim 4 and sections 7 of the tire, and the edges of the plates 10 being hinged as at 11, permit the free, resilient action of the sections 7 of the tire.

Should one of the sections 7 become worn, it may be removed by first removing the bolts 13, after which the plates 10 may be removed from the openings 9 and the section 7 removed from the rim 4. This being done, a new section may be applied to the rim in the position previously occupied by the worn section. The plates 10 may then be placed within the openings 9, and the bolts 13 passed through the openings in the rim 4 and sections 7, and screwed into the plates 10, thus securely holding the new section in place.

I claim:—

1. The combination of a wheel rim having a channel therein, a sectional resilient tire extending into said channel, each section of said tire having a transverse opening therein, a member extending through said opening and comprising a pair of plates hinged together, and means connecting said member with said rim and holding said tire in place.

2. The combination of a wheel rim having a channel therein, a sectional resilient tire extending into said channel, each section of said tire having a transverse opening therein, a member extending through said opening and comprising a pair of plates hinged together, and bolts extending through said rim and tire and engaging said member.

3. The combination of a wheel rim having a channel therein, a sectional resilient tire extending into said channel, each section of said tire having a transverse opening therein, a member extending through said opening and comprising a pair of plates hinged together and having inwardly bent ends engaging the sides of the tire, and means connecting said member with said rim and holding said tire in place.

4. The combination of a wheel rim having a channel therein, a sectional resilient tire extending into said channel, each section of said tire having a transverse opening therein, a member extending through said opening and comprising a pair of plates hinged together and having inwardly bent ends engaging the sides of the tire, and bolts extending through said rim and tire and engaging said member.

5. The combination of a wheel rim having a channel therein, a sectional resilient tire extending into said channel, each section of said tire having a transverse opening therein, a member extending through said opening and comprising a pair of plates hinged together, a collar surrounding the hinged portion of said plates, and means connecting said member with said rim and holding said tire in place.

In testimony whereof I affix my signature in presence of two witnesses.

JOSEPH ALLEND.

Witnesses:
S. I. HARPER,
E. M. WARE.